United States Patent [19]

Zinner

[11] Patent Number: 5,066,860
[45] Date of Patent: Nov. 19, 1991

[54] OPTICAL SENSOR

[75] Inventor: Helmut Zinner, Haar, Fed. Rep. of Germany

[73] Assignee: Messerschmitt-Bölkow-Blohm GmbH, Munich, Fed. Rep. of Germany

[21] Appl. No.: 680,606

[22] Filed: Apr. 1, 1991

Related U.S. Application Data

[63] Continuation of Ser. No. 452,114, Dec. 15, 1989, abandoned.

[30] Foreign Application Priority Data

Dec. 23, 1988 [DE] Fed. Rep. of Germany ....... 3843470

[51] Int. Cl.$^5$ .............................................. G01C 21/12
[52] U.S. Cl. .................................... 250/349; 250/332; 250/203.6
[58] Field of Search ............................ 244/3.16, 3-11; 250/349, 330, 332, 203.6; 356/152, 4

[56] References Cited

U.S. PATENT DOCUMENTS 3,862,424 1/1975 Abel et al. ............................ 250/349
4,193,688 3/1980 Watkins ................................ 356/152

FOREIGN PATENT DOCUMENTS 3446009 12/1984 Fed. Rep. of Germany ...... 250/349

Primary Examiner—Carolyn E. Fields
Assistant Examiner—James E. Beyer
Attorney, Agent, or Firm—Kenyon & Kenyon

[57] ABSTRACT

An optical sensor for detecting targets and determining the characteristic motion of a missile approaching a target. In order to have a simple designed sensor and to provide for a simple transformation of the coordinates of the missile and of the target to be determined, the optical sensor has an optical system, which, with the help of a semitransparent mirror, forms an image of the scene lying within the field of view of the optical system onto two detectors. The first detector is a planar detector having a plurality of detector elements disposed in a matrix arrangement, onto which the scene is sharply imaged, whereas the second detector is a cross detector, which is configured outside of the focal point of the optical system. With this detector, the spatial and time derivatives of the light intensity incident on the optical system and, from it, the characteristic motions of the missile are determined.

10 Claims, 2 Drawing Sheets

OPTICAL SENSOR

This is a continuation of application Ser. No. 07/452,114, filed Dec. 15, 1989, entitled OPTICAL SENSOR, now abandoned.

BACKGROUND OF THE INVENTION

The present invention relates to an optical sensor, which is used in connection with the guidance of a missile toward a target.

Optical sensors used to detect targets are known which form a sharp image of the target scene lying within the field of view of an optical system onto a planar sensor, which is constructed of a plurality of detector elements configured in a matrix. In an evaluation circuit, those signals which are clearly attributable to a target are selected from the signals of the detector elements. Based on this evaluation, the missile is then guided toward the target.

A condition for such a guidance is the requirement for a coordinate reference system, into which the characteristic motions of the missile, that is roll, pitch, yaw and flight direction, as well as the target coordinates and target movements are projected.

Such a coordinate reference system can be preset, for example, by an inertial system, for instance, a gyroscopic system, inside the missile. Another possibility lies in calculating the characteristic motion of the missile with the help of a rigidly installed sensor consisting of several detector rows, arranged, for example, in a T-shape, on which only a part of the target scene is imaged, and of an image processing unit, and in projecting from the coordinate system fixed with respect to the missile into the coordinate reference system. See, e.g., DE-OS 34 46 009. The detector rows of the sensor do not lie in the focal plane of the sensor's optical system, so that a "smeared" image is formed of a point of the target scene lying at infinity, for which this image is evaluated with respect to the spatial and time derivatives of the individual image points.

SUMMARY OF THE INVENTION

An object of the present invention is to provide a simply designed sensor, which can be used for missile guidance, and with which signals are derivable, which are relevant both for the characteristic motion of the missile and also for the target movements.

The above and other objects of the present invention are achieved by an optical sensor designed to detect targets and determine the characteristic motion of a missile approaching a target, comprising an optical system having a focal plane for forming an image of the scene lying within the field of view of the optical system onto two detectors, the first detector comprising a plurality of detector elements configured in a planar matrix, and the scene containing the target being sharply imaged onto said detector elements, the second detector comprising at least two intersecting sensor bars having a group of detector elements lying outside of the focal plane of the optical system, so that an image of a target point situated at infinity is imaged onto several detector elements of the second detector.

Accordingly, the objectives of determining the characteristic motion and target acquisition and tracking are achieved by two imaging partial sensors, which as a total sensor have a shared optical system. Preferably, the two partial sensors, or rather the detector elements used for these partial sensors, operate in different wavelength ranges, whereby the detector for target acquisition is preferably sensitive in the 3 to 5 micrometer wavelength range and the second detector for detecting the characteristic motion is sensitive in the 8 to 14 micrometer range.

Each partial sensor is optimally adapted to its task. The shifting of the target scene due to the characteristic motion of the missile is measured by one detector directly in the image plane. This shifting can be compensated mathematically, so that changes in the target scene, such as, for example, movements of a motor vehicle, can be detected. When conventional methods are used, the characteristic motion of the sensor is determined with inertial systems, for example, and converted or corrected into the image plane. This is much more costly. By using two partial sensors, fixed with respect to the missile, the total expense for constructing the sensor is considerably reduced, whereby the process of projecting data from the coordinate system fixed with respect to the missile into a coordinate reference system is simplified as well.

BRIEF DESCRIPTION OF THE DRAWINGS

The invention will be described in greater detail in the following detailed description with reference to the drawings, in which.

DETAILED DESCRIPTION

Figure 1:
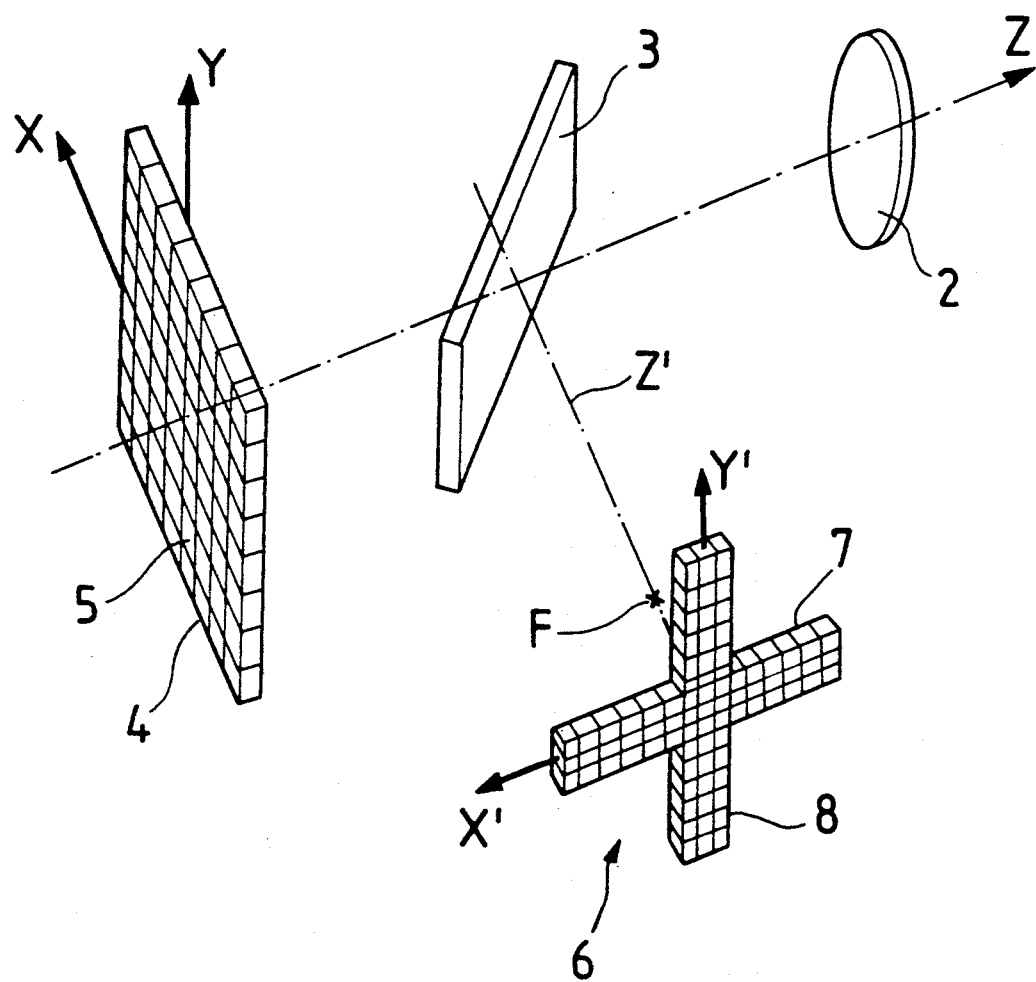
FIG. 1 is a schematic perspective view of an optical sensor according to the invention having two detectors.

An optical sensor 1 depicted in FIG. 1 has an optical system 2, whose optical axis lies in the Z-direction of a rectangular coordinate system having coordinate directions X, Y and Z. The radiation passing through the optical system 2 falls on a beam splitter 3 in the form of a semitransparent mirror. This mirror is made of a material, which more strongly reflects radiation with wavelengths in the 8 to 14 micrometer range than radiation with wavelengths in the 3 to 5 micrometer range. Therefore, the mirror 3 allows a large part of the radiation in the 3 to 5 micrometer range to pass through so it falls on a first detector 4 which will be referred to herein as the rectangular detector. The rectangular detector comprises a square or rectangular configuration of detector elements 5. The surface of the detector lies directly in the focal plane of the optical system 2, that is, in the X-Y plane, so that the scene picked up by the optical system is imaged onto this detector 4. The rectangular detector 4 is used to detect and track a target and possibly to further interpret the scene picked up by the optical system. IR-CCD [infrared, charge-coupled] detectors, which are sensitive to the light with 3 to 5 micrometer wavelengths, are especially suited for detecting land vehicles from the air.

Figure 2:
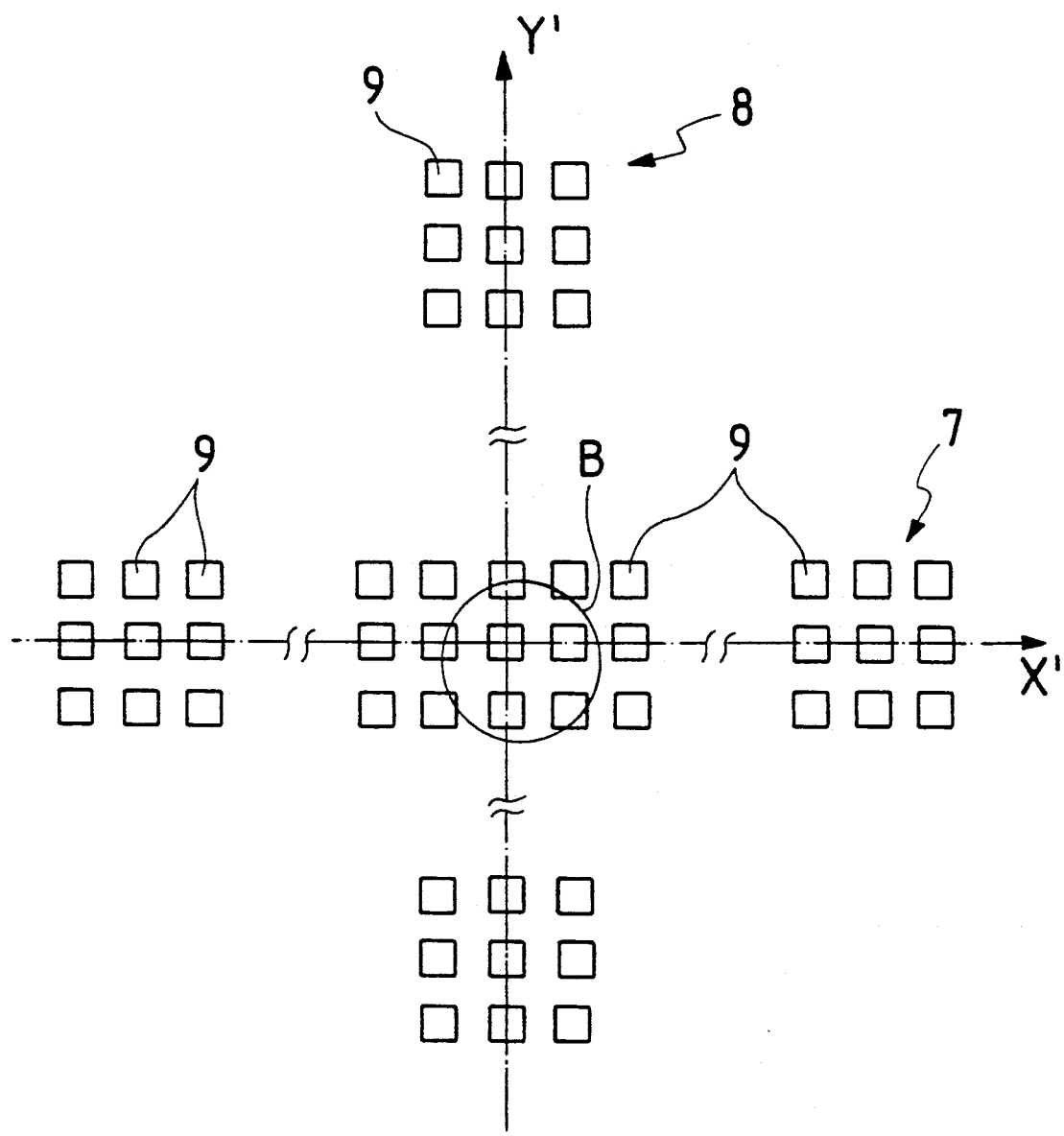
FIG. 2 is a schematic top view of the second detector.

The light deflected by the semitransparent mirror 3 falls on a second detector 6, referred to herein as the cross detector, which comprises two perpendicularly crossing sensor bars 7 and 8 extending along the X' or Y' axis. These axes lie perpendicularly to the sensor's optical axis deflected by the semitransparent mirror 3 and identified as Z'. Each bar 7 and 8 of the cross detector 6 comprises three parallel rows of detector elements 9, as depicted schematically in FIG. 2.

The focal point of the optical system 2 for the radiation in the 8 to 14 micrometer range lies on the optical axis Z′ in front of the cross detector 8 and is marked with F in FIG. 1. By this means, a point lying at infinity of the scene detected by the optical system 2 is imaged out of focus or blurred onto the cross detector 6, so that the image B indicated schematically in FIG. 2 covers several detector elements 9. With this cross detector, the spatial and time derivatives of light intensity are calculated at several points along the axes X′=0 and Y′=0, as described in detail in DE-OS 34 46 009.

According to the German Patent No. DE-OS 34 46 009 an optical system, which is oriented to the front and whose optical axis preferably conforms with the longitudinal axis of the missile, is arranged in the front part of a missile. A surface arrangement of a multitude of photodetector elements, for example CCD image sensors, is situated in the focal plane on the image side of the optical system. Contiguous to this surface arrangement is an image-processing unit, in which the spatial and temporal derivatives of the image-point intensity values read out from the photodector elements are formulated. These values are subsequently fed to an arithmetical element, which is used to calculate the desired variables or parameters, that indicate the rolling, pitching and yawing motion, as well as the flight direction of the missile. These variables can be drawn upon subsequently to implement any necessary positioning corrections.

Also, according to German Patent No. DE-OS 34 46 009, a three dimensional coordinate system OXYZ, which is fixed relative to the missile, has its origin O in the optical system, and the direction of the optical axis 2 coincides with the Z axis. The image plane for quasi-infinitely distant objects lies with an image-side clearance f from the focal distance on the image side, behind the optical system or the origin O.

The photodetector elements are arranged in this image plane in a surface allocation, for example as a matrix or in a T-shape. The image plane reflected at the origin O is depicted with the image-point two dimensional coordinate system OXY. An image of the object point P (XYZ) is formed, as an example, in the reflected image plane on the "reflected" photodetector element with the image-point coordinates xy.

The flight direction of the missile can deviate from the direction of the optical axis. An object point in the displayed scene corresponds to this flight direction. An image of this object point is then formed in the reflected image plane in an image point with the coordinates $x_o$, $y_o$.

When the flight direction and orientation of the missile are constant, this image point is the only one to remain at rest as a function of time, while the image points of all remaining object points in the image plane are increasingly in motion (image explosion) toward the margin of image. A pure translatory motion in the flight direction can still be superimposed by rotations with respect to the axes X, Y, Z, whose corresponding angular velocities are $\omega_x$, $\omega_y$, $\omega_z$.

It is possible to calculate the desired variables, namely the angular velocities $\omega_x$, $\omega_y$, $\omega_z$ of the rolling, pitching and yawing motions, as well as the flight direction given by the image-point coordinates $x_o$, $y_o$ based solely on the image-point intensity values in the image plane to be read out of the photodetector elements, as well as their temporal and spatial variations.

To make these calculations, first of all, the following relationship exists between the object-point coordinates X, Y, Z and the image-point coordinates x, y:

$$\begin{pmatrix} x \\ y \end{pmatrix} = \left(\frac{f}{z}\right)\begin{pmatrix} x \\ y \end{pmatrix} \quad (1)$$

For the image-point velocities $V_x$ $V_y$ it is according to the expression:

$$\begin{pmatrix} V_x \\ V_y \end{pmatrix} = \frac{1}{z}\begin{pmatrix} -T_x f + xT_z \\ -T_y f + yT_z \end{pmatrix} + \omega_x \begin{pmatrix} xy/f \\ f + y^2/f \end{pmatrix} - \omega_y \begin{pmatrix} f + x^2/f \\ xy/f \end{pmatrix} + \omega_z \begin{pmatrix} y \\ -x \end{pmatrix} \quad (2)$$

whereby the following relation between the velocity vector V of the point P (X, Y, Z) as well as its translational term $T=(T_x, T_y, T_z)$ and its rotational term $\overline{\Omega}=(\omega_x, \omega_y, \omega_z)$ were considered. With the dimensionless coordinates and velocities $$\xi = \frac{x}{f}, \eta = \frac{y}{f}; \mu = \frac{V_x}{f}, w = \frac{V_x}{f} \quad (3)$$

standardized to the focal length f, the following expression results from this for the standardized velocity vector field of the image points in the image plane:

$$\begin{pmatrix} u \\ w \end{pmatrix} = \frac{1}{z}\begin{pmatrix} -T_x + \xi T_z \\ -T_y + \eta T_z \end{pmatrix} + \omega_x \begin{pmatrix} \xi\eta \\ 1 + \eta^2 \end{pmatrix} - \omega_y \begin{pmatrix} 1 + \xi^2 \\ \xi\eta \end{pmatrix} + \omega_z \begin{pmatrix} \eta \\ -\xi \end{pmatrix} \quad (4)$$

In principle, from these standardized velocities, the angular velocities $\omega_x$, $\omega_y$, $\omega_z$, can be calculated as well as the direction of the translatory motion (flight direction, center of the explosion) given by the parameters $\xi_o = T_x/T_z$, $\eta_o = T_y/T_z$. For this, there is a need to measure the velocity vectors (u,w) in the image plane. So far, this problem has not yet been solved satisfactorily.

A considerable degree of simplification is achieved when a plane is selected as a surface. This is an assumption that should be fulfilled often, at least approximatively, for example in a flat terrain. The following expression is able to be derived from an appropriate plane equation in X, Y and Z, after substituting the coordinates X, Y by the image-point coordinates x, y, respectively $\xi$, $\eta$ on the basis of the image-formation equations:

$$\frac{1}{z} = \frac{\xi}{A} + \frac{\eta}{B} + \frac{1}{C} \quad (7)$$

By substituting this expression for 1/z, as well as with $a=T_z/A$, $b=T_zB$, $c=T_z//C$, the following system of expressions results:

$$I_x[\omega_x\xi\eta - \omega_y(1 + \xi^2) + \omega_z\eta + (a\xi + b\eta + c)(\xi - \xi_o)] + \quad (8)$$

$$I_y[\omega_x(1 + \eta^2) - \omega_y\xi\eta - \omega_z\xi + (a\xi + b\eta + c)(\eta - \eta_o)] +$$

-continued $$\frac{I_t}{f} = 0$$

whereby now except for the five already mentioned, sought after variables, the parameters a, b, c are also still to be determined. After determining the values $I_x$, $I_y$ as well as $I_t$ for at least 8 image points (x, y) or ($\xi$, $\eta$), this system of expression may be solved.

The allocation of the image-point intensities I (x, y, t) is scanned at discrete time intervals. From this, the spatial, as well as the temporal derivatives, can be calculated according to known methods.

The task of solving of the system of expression (8) is simplified quite considerably, when the derivatives $I_x$, $I_y$, $I_t$ are calculated for image points on the axes x=0 and y=0. The system of expressions falls then into two components:

1. Image points on the x-axis:

$$h = I_x(\xi, 0)[-\omega_y(1 + \xi^2) + (\xi a + c)(\xi - \xi_0)] + \qquad (9a)$$

$$I_y(\xi, 0)[\omega_x - \omega_z\xi + (\xi a + c)(-\eta_0)] + \frac{I_t(\xi, 0)}{f} = 0$$

2. Image points on the y-axis:

$$gI_x(0, \eta)[-\omega_y + \omega_z\eta + (\eta b + c)(-\xi_0)] + \qquad (9b)$$

$$I_y(0, \eta)[\omega_x(1 + \eta^2) + (\eta b + c)(\eta - \eta_0)] + \frac{1}{f} I_t(0, \eta) = 0$$

This system of expressions may be solved using standard methods:

For example, the sum $$\sum_x h^2(x) + \sum_y g^2(y) \to \min$$

can be minimized by means of a Newtonian iteration.

A T-shaped surface arrangement of photodetector elements, which can be CCD image sensors for example, may be used. The arrangement falls into two groups, which consist respectively of three parallel rows of photodetector elements. The middle row of the one group is situated in the image plane on the x-axis (y=0), the middle row of the other group oriented perpendicularly to the first group is situated in the image plane on the y-axis (x=0). Each group should have at least three parallel rows, whereby the number of single photodetector elements within one row should be considerably greater than the number of rows itself. To improve the formulation of the derivatives, instead of three, one can also select five, seven or more rows per group.

The intensity values I (x, y, t) are read out of the rows in a parallel manner and entered into memory, where the intensity values are stored and the spatial and temporal derivatives can be calculated. To calculate the temporal derivatives, only the read-out image-point intensity values of the middle rows are needed, since for this, the values from successive samplings of the same image points or photodetector elements are used.

To calculate the spatial derivatives, starting from selected image points or photodetector elements on the axes, the image-point intensity values from the adjoining image points or photodetector elements in the x- and y-direction are required, and in fact respectively from the same sampling scanning. Memory is used to calculate the spatial derivative and to calculate the temporal derivative. The evaluation proceeds thereby as follows:

Four image points each are selected, for example, on the x- and the y-axis. The corresponding image-point intensity values are then read into the memory and at the instants t=−2, t=−1, t=0. From this, the temporal derivatives I= are calculated at the instant t=0 for the corresponding image points (x, o) or (o, y). In addition, at the instant t=0, the image-point intensity values from the respective three parallel rows are read into memory, where the spatial gradients $I_x$ (X, O), $I_y$ (X, O), $I_x$ (O, y) and $I_y$ (O, y) are calculated for the selected image points. The prerequisite for this is that the derivatives exist. For this purpose, the image must be low-pass filtered, which is able to be achieved most easily through defocussing.

The calculated derivatives from the image-processing unit are subsequently supplied to an arithmetical element, where the mentioned Newtonian iteration is carried out. For this purpose, in the first calculating step, starting values for the parameters $\omega_x$, $\omega_y$, $\omega_z$, $\xi$, $\eta$, a, b, as well as c are specified from the outside. For these parameters, one obtains values which are constantly improved, and the procedure is discontinued as soon as the realized improvements lie below a specifiable threshold.

The described, special T-shaped arrangement of the detector elements means that the sought after variables or parameters can be calculated on the whole considerably faster than is possible with a rectangular arrangement of the photodetector elements. By selecting the image points on the x- and y-axis, the above-described mathematical formulation is able to be considerably simplified. It should be pointed out that the assumption of a plane object-point surface 1s, of course, not applicable in all cases. Certainly, it makes it possible to considerably simplify the mathematical apparatus. If needed, surfaces of a higher order can also be selected.

The present invention determines the characteristic motion of the missile according to the calculations in German Patent No. DE-OS 34 46 009. Accordingly, to form the spatial and determined from these calculations. To form the spatial and time derivatives of intensity, at least three parallel detector rows are needed for each sensor bar 7 or 8. One can further improve the accuracy with which the characteristic motion of the missile is determined by increasing the number of detector rows. The detector elements 9 of this cross detector are also preferably CCD (charge coupled device) elements sensitive in the infrared range between 8 and 14 micrometers. At these wavelengths, the contrast of the background is sharp enough to determine the required spatial and time derivatives.

In the foregoing specification, the invention has been described with reference to a specific exemplary embodiment thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. An optical sensor for detecting a target and for determining characteristic motion of a missile approaching the target, comprising:

an optical system having a focal plane for forming an image of a scene containing the target lying within a field of view of the optical system onto at least a first and a second detector;

the first detector comprising a plurality of first detector elements configured in a planar matrix, and the scene containing the target being sharply imaged onto said first detector elements;

the second detector comprising at least two intersecting sensor bars having a group of second detector elements lying outside of the focal plane of the optical system, so that an image of a target point situated at infinity is imaged onto several second detector elements.

2. The optical sensor recited in claim 1, wherein a beam splitter is provided between the optical system and the first and second detectors.

3. The optical sensor recited in claim 2, wherein the beam splitter comprises a semitransparent mirror.

4. The optical sensor recited in claim 2, wherein the second detector has two sensor bars arranged perpendicularly to each other, each comprising several parallel rows of second detector elements.

5. The optical sensor recited in claim 4, wherein each sensor bar comprises at least three parallel rows of second detector elements.

6. The optical sensor recited in claim 1, wherein each of the first and second detectors are sensitive in different spectral ranges.

7. The optical sensor recited in claim 2, wherein the beam splitter retransmits radiation of a first spectral range to the first detector and radiation of a second spectral range to the second detector.

8. The optical sensor recited in claim 5, wherein the beam splitter retransmits radiation of a first spectral range to the first detector and radiation of a second spectral range to the second detector.

9. The optical sensor recited in claim 6, wherein the first detector is sensitive to radiation with 3 to 5 micrometer wavelengths and the second detector is sensitive to radiation with 8 to 14 micrometer wavelengths.

10. The optical sensor recited in claim 7, wherein the first detector is sensitive to radiation with 3 to 5 micrometer wavelengths and the second detector is sensitive to radiation with 8 to 14 micrometer wavelengths.

* * * * *